US010373418B1

(12) United States Patent
Grant et al.

(10) Patent No.: US 10,373,418 B1
(45) Date of Patent: Aug. 6, 2019

(54) ICE DISPENSING VENDING MACHINE

(71) Applicants: William Grant, Columbus, OH (US); Mira D. Harris, Columbus, OH (US)

(72) Inventors: William Grant, Columbus, OH (US); Mira D. Harris, Columbus, OH (US)

( * ) Notice: Subject to any disclaimer, the term of this patent is extended or adjusted under 35 U.S.C. 154(b) by 0 days.

(21) Appl. No.: 15/905,851

(22) Filed: Feb. 27, 2018

(51) Int. Cl.
*G07F 17/00* (2006.01)
*G06Q 20/24* (2012.01)
*F25C 5/20* (2018.01)

(52) U.S. Cl.
CPC ............ *G07F 17/0071* (2013.01); *F25C 5/20* (2018.01); *G06Q 20/24* (2013.01)

(58) Field of Classification Search
CPC ........ G07F 17/0071; G06Q 20/24; F25C 5/20
USPC .................................................. 700/231–244
See application file for complete search history.

(56) References Cited

U.S. PATENT DOCUMENTS 7,448,516 B2 * 11/2008 Davis ..................... A23G 9/281 222/146.6
10,000,370 B2 * 6/2018 Bethuy ................ B67D 1/0025
10,017,372 B2 * 7/2018 Bethuy ............... A47J 31/4403
2004/0251270 A1 * 12/2004 Davis ..................... A23G 9/281 222/2
2013/0341344 A1 * 12/2013 Abston ................... G07F 9/105 221/150 R
2016/0090288 A1 * 3/2016 Givens, Jr. ........... B67D 1/0041 700/283
2018/0187939 A1 * 7/2018 Blosser ................... F25C 1/147

* cited by examiner

*Primary Examiner* — Michael Collins
(74) *Attorney, Agent, or Firm* — The Iwashko Law Firm, PLLC; Lev Ivan Gabriel Iwashko

(57) ABSTRACT

A vending machine to dispense ice into a container, the vending machine including a body, a container receiving compartment disposed at a front portion of the body to house the container therein, an ice dispensing spout disposed at a top portion of the container receiving compartment to dispense the ice into the container, a start button to cause the ice to be dispensed from the ice dispensing spout, and at least one of a credit card slot, a dollar bill slot, and a coin slot to activate the start button when the vending machine senses that money has been received within the vending machine via the at least one of the credit card slot, the dollar bill slot, and the coin slot, such that the ice is dispensable from the ice dispensing spout when the start button is activated.

2 Claims, 1 Drawing Sheet

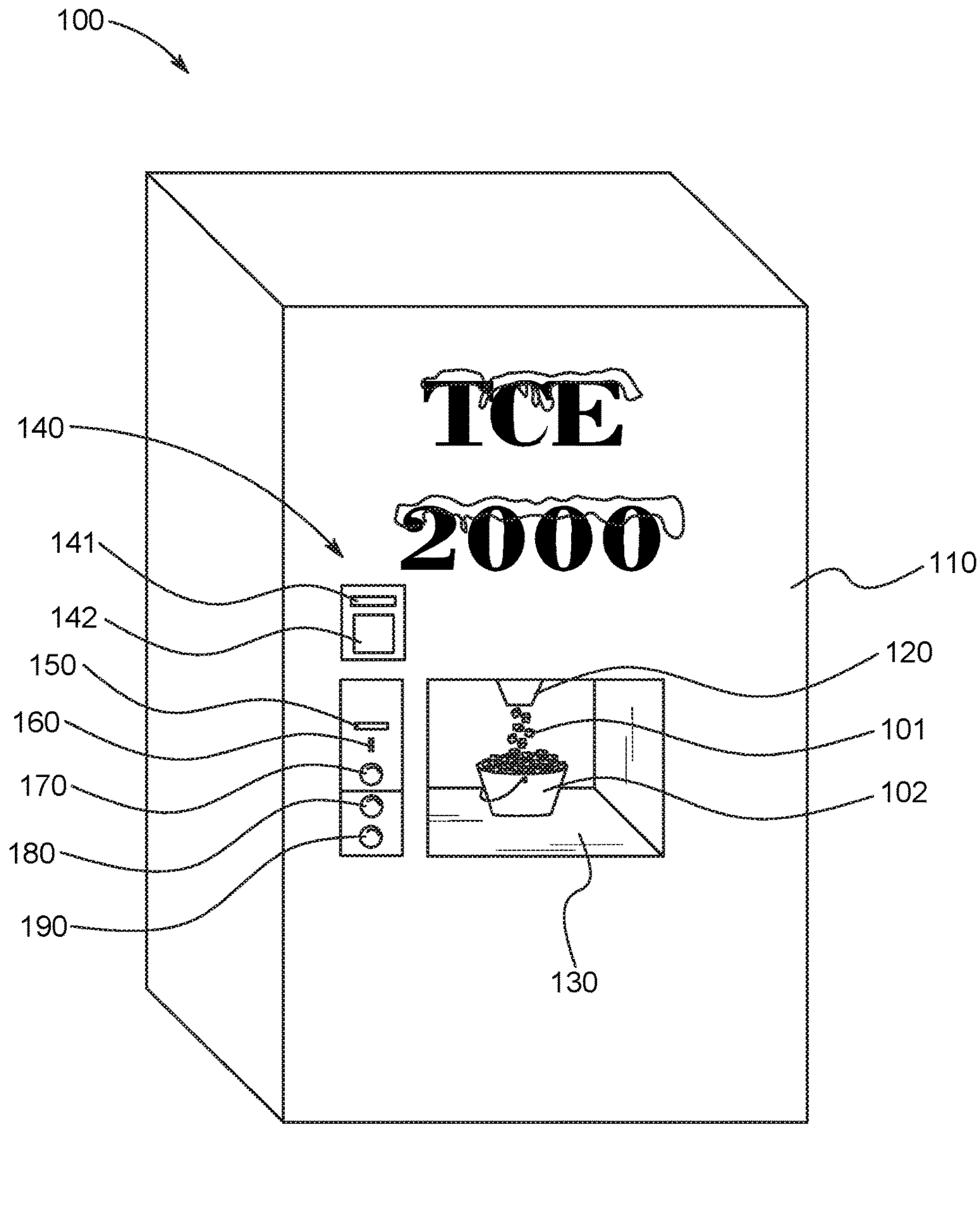
100
TCE
2000
140
141
142
150
160
170
180
190
110
120
101
102
130

ICE DISPENSING VENDING MACHINE

BACKGROUND

1. Field

The present general inventive concept relates generally to a vending machine, and particularly, to a vending machine to dispense ice.

2. Description of the Related Art

Currently, many businesses have a dispensing machine on-site where one many insert money to purchase ice. However, such ice dispensers may only offer 10 or 20 lbs. ice bags, which is an excessive amount for consumers that simply want a servings worth to fill an on-the-go personal cup.

Therefore, there is a need for a vending machine that dispenses ice, based on a user's preference.

SUMMARY

The present general inventive concept provides a vending machine to dispense ice.

Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing a vending machine to dispense ice into a container, the vending machine including a body, a container receiving compartment disposed at a front portion of the body to house the container therein, an ice dispensing spout disposed at a top portion of the container receiving compartment to dispense the ice into the container, a start button to cause the ice to be dispensed from the ice dispensing spout, and at least one of a credit card slot, a dollar bill slot, and a coin slot to activate the start button when the vending machine senses that money has been received within the vending machine via the at least one of the credit card slot, the dollar bill slot, and the coin slot, such that the ice is dispensable from the ice dispensing spout when the start button is activated.

The vending machine may further include a cubed ice selector button to cause the ice to be cubed when the ice is dispensed from the ice dispensing spout, and a crushed ice selector button to cause the ice to be crushed when the ice is dispensed from the ice dispensing spout.

The vending machine may further include an input to allow a user to enter at least one of an amount of ice to be dispensed from the ice dispensing spout and an amount of money desired to be extracted from a credit card.

The input unit may display selectable container sizes, such that selection of the container size causes the input unit to display a monetary amount required to fill a container having the corresponding container size with the ice.

BRIEF DESCRIPTION OF THE DRAWINGS

These and/or other features and utilities of the present generally inventive concept will become apparent and more readily appreciated from the following description of the embodiments, taken in conjunction with the accompanying drawings of which:

FIG. 1 illustrates a vending machine to dispense ice, according to an exemplary embodiment of the present general inventive concept.

DETAILED DESCRIPTION

Various example embodiments (a.k.a., exemplary embodiments) will now be described more fully with reference to the accompanying drawings in which some example embodiments are illustrated. In the figures, the thicknesses of lines, layers and/or regions may be exaggerated for clarity.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the disclosure. Like numbers refer to like/similar elements throughout the detailed description.

It is understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art. However, should the present disclosure give a specific meaning to a term deviating from a meaning commonly understood by one of ordinary skill, this meaning is to be taken into account in the specific context this definition is given herein.

FIG. 1 illustrates a vending machine 100 to dispense ice 101, according to an exemplary embodiment of the present general inventive concept.

The vending machine 100 may include a body 110, an ice dispensing spout 120, a container receiving compartment 130, a credit card panel 140, a dollar bill insert slot 150, a coin insert slot 160, a start button 170, a cubed ice selector button 180, and a crushed ice selector button 190.

The body 110 may include therein an automatic ice maker (not illustrated) including a freezer unit connected to a water hose, which automatically produces an ice supply. This type of automatic ice maker is known to one of ordinary skill in the art.

The body 110 may also include a computer (not illustrated) thereinside, including a processor, a controller, a sensor, a communication unit, etc., in order to read and interpret button instructions, credit card swipes, and/or money input by a user. This type of computer is known to one of ordinary skill in the art.

The ice dispensing spout 120 may dispense the ice 101 therefrom, based on the user's input.

The container receiving compartment 130 may be disposed at a front portion of the body 110, and may have a size large enough to place a container 102 (e.g., a cup, bucket, and/or bag) therein, such that the ice 101 may be collected in the container 102.

The ice dispensing spout 120 may be disposed at a top portion of the container receiving compartment 130.

The a credit card panel 140 may include a credit card slot 141 and an input unit 142

The credit card slot 141 may allow a credit card to be inserted therein, read, and processed.

The input unit 142 may include a display unit, a touch screen, and/or a keypad to allow the user to type in an amount of money, such that an amount of the ice 101 is dispensed from the ice dispensing spout 120 after the credit card is processed. Also, the input unit 142 may communicate with mobile devices, such as cell phones, that have vending applications running thereupon, such that money is directly extracted from the user's account to pay for the ice 101.

Additionally, the input unit 142 may display a variety of other options for a user, including, but not limited to, an option to dispense, out of the ice dispensing spout 120, crushed ice having a particular flavor (e.g., strawberry, blueberry, lemon, lime, cherry, grape, orange, etc.), slushy ice having a particular flavor (or multiple flavors). Also, there may be other dispensable objects to be dispensed from the vending machine 100, such as bottled water, hot water, cold water, soda, etc.

The dollar bill insert slot 150 may allow the user to insert paper money therein.

The coin insert slot 160 may allow the user to insert coin money therein.

The start button 170 may cause the ice 101 to be dispensed from the ice dispensing spout 120 when the start button 170 is pressed by the user.

The cubed ice selector button 180 may allow the user to cause the ice dispensing spout 120 to dispense cubed ice 101.

The crushed ice selector button 190 may allow the user to cause the ice dispensing spout 120 to dispense crushed ice 101.

In order to operate the vending machine 100, the user may first insert the container 102 into the container receiving compartment. Next, the user may either: (1) insert a credit card into the credit card slot 141 and input an amount of money that the user desires into the input unit 142, (2) insert paper money into the dollar bill insert slot 150, or (3) insert coins into the coin insert slot 160. The credit card slot 142, the dollar bill slot 150, and the coin slot 160 may activate the start button when the vending machine 100 senses that money has been received within the vending machine 100 via one of the credit card slot 142, the dollar bill slot 150, and the coin slot 160, such that the ice 101 is dispensable from the ice dispensing spout 120 when the start button is activated. After the money is received by the vending machine 100, the user may then select whether cubed ice 101 or crushed ice 101 is desired, by pressing either the cubed ice selector button 180 or crushed ice selector button 190, respectively. When the type of ice 101 is selected, then the user may press the start button 170 to begin dispensing the ice 101 from the ice dispensing spout 120 into the container 102.

As a result, the more money that is inserted into the vending machine 100, the more ice 101 may be dispensed from the ice dispensing spout 120 into the container 102.

The present general inventive concept may also include a size selector, which allows a predetermined amount of the ice 101 to be dispensed from the ice dispensing spout 120. In other words, if the user would like to fill up a large water bottle, for example, the user could select a medium size (from selectable small, medium, large, and extra large sizes), such that the large water bottle is filled completely with the ice. When the size is selected by the user, a predetermined amount of money may be required to be inserted into the vending machine 100 to correspond to the size selected. Therefore, for example, filling a cup with the ice 101 may cost 25 cents, while filling a bucket may cost $1.00, and filling a bag may cost $5.00, but these sizes and prices are not limited thereto. Accordingly, when the size is selected by the user, the input unit 142 may display a required amount of money that is needed for the container corresponding to the selected size to be filled.

The input unit 142 may display selectable container sizes, such that selection of the container size causes the input unit 142 to display a monetary amount required to fill the container 102 having the corresponding container size with the ice 101.

The present general inventive concept may also include a sensor at the container receiving compartment 130, which may actually sense a size of the container 102, such that the input unit 142 may display how much money the user should insert into the vending machine 100 to fill the container 102.

The present general inventive concept may also include a coin return aperture, which may return coins when money is left over after the ice 101 is dispensed.

Finally, the vending machine 100 may be provided in various sizes, such as large sizes for sports arenas and rest stops (i.e., dispensing buckets filled with ice), medium sizes for warehouses and metro parks (i.e., dispensing single cups filled with ice), and small sizes for residences and corporate kitchenettes (i.e., dispensing ice).

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

The invention claimed is:

1. A vending machine to dispense ice into a container having a predetermined size, the vending machine comprising:

a body;

a container receiving compartment disposed at a front portion of the body to house the container having the predetermined container size therein;

an ice dispensing spout disposed at a top portion of the container receiving compartment to dispense the ice into the container;

a start button to cause the ice to be dispensed from the ice dispensing spout;

at least one of a credit card slot, a dollar bill slot, and a coin slot to activate the start button when the vending machine senses that money has been received within the vending machine via the at least one of the credit card slot, the dollar bill slot, and the coin slot, such that the ice is dispensable from the ice dispensing spout when the start button is activated; and an input unit to allow a user to enter at least one of an amount of ice to be dispensed from the ice dispensing spout and an amount of money desired to be extracted from a credit card, such that the input unit displays selectable container sizes, such that selection of the container size corresponding to the container having the predetermined size causes the input unit to display a monetary amount required to fill the container having the predetermined container size with the ice, and selection of the container size causes the container having the predetermined container size to be filled with the ice via the ice dispensing spout.

2. The vending machine of claim 1, further comprising:

a cubed ice selector button to cause the ice to be cubed when the ice is dispensed from the ice dispensing spout; and a crushed ice selector button to cause the ice to be crushed when the ice is dispensed from the ice dispensing spout.

* * * * *